Aug. 31, 1965
S. R. TUNNELL
3,203,135
FLY SWATTER HANDLES
Filed July 20, 1964
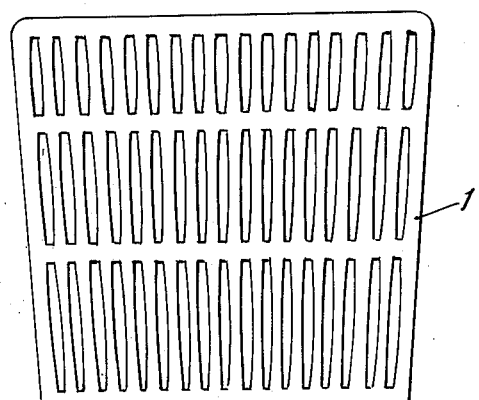
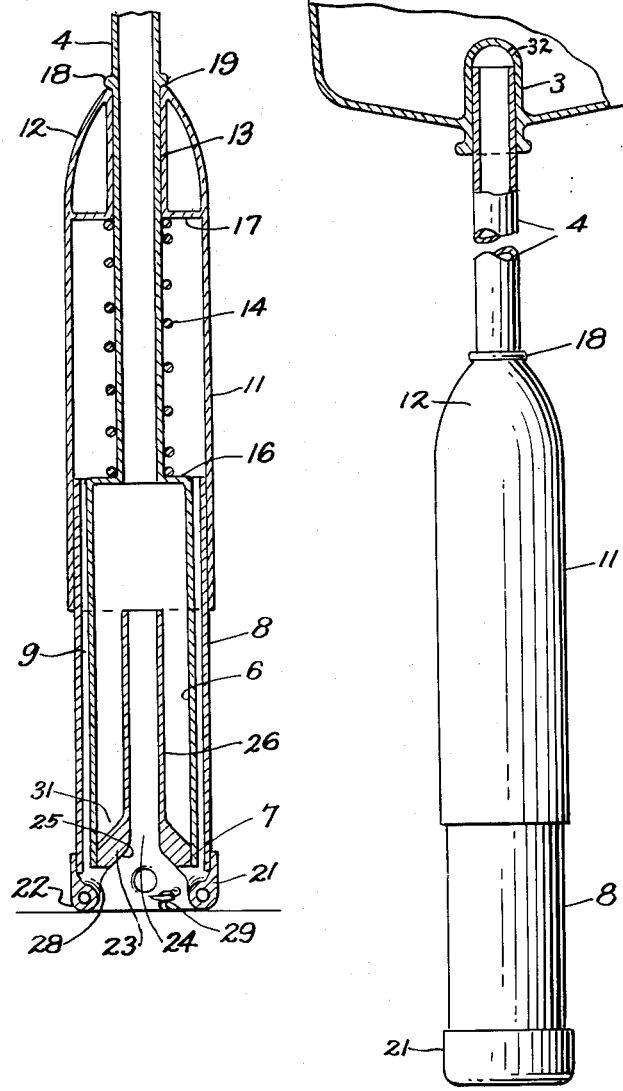
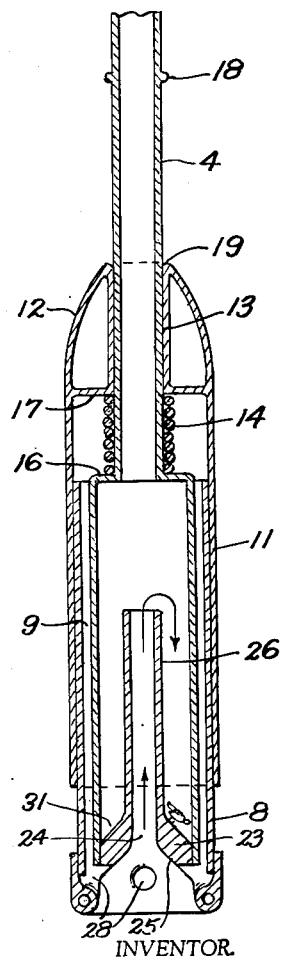
INVENTOR.
SAMUEL R. TUNNELL
BY George B White
ATTORNEY

United States Patent Office 3,203,135
Patented Aug. 31, 1965

3,203,135
FLY SWATTER HANDLES
Samuel R. Tunnell, 426 Bishop Ave.,
Pacific Grove, Calif.
Filed July 20, 1964, Ser. No. 383,628
6 Claims. (Cl. 43—137)

This invention relates to a fly swatter handle for picking up and collecting dead insects.

The primary object of the invention is to provide a handle for a fly swatter, the end of which can be placed over the dead insect and then by compressing the handle suction is created substantially similarly to the action of a Venturi tube to suck the insect into a collecting space within the handle.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is partly fragmental and partly sectional view of a fly swatter provided with an insect collecting handle.

FIG. 2 is a fragmental sectional view of the insect collecting handle in extended position.

FIG. 3 is a fragmental sectional view of the handle compressed for sucking up an insect.

The usual fly swatter 1 has a base or hub 2 with a pocket 3 into which is frictionally or otherwise secured the end of a tubular handle rod 4.

On the free end of the handle rod 4 is an enlarged cylindrical head 6 open at its bottom 7. The cylindrical head 6 forms a chamber and is surrounded by an outer tube 8 so as to provide a space or passage 9 between the head 6 and the outer tube 8.

On the outside of the tube 8 is slidable a generally cylindrical compressor sleeve 11 which has a dome 12 at its closed end nearer to the fly swatter 1. A bore 13 through the dome 12 slidably fits over the handle rod 4. A coil spring 14 around the handle rod 4 and between the top 16 of the head 6 and the bottom 17 of the hollow dome 12 normally urges the compressor tube 11 toward the fly swatter 1. The stroke of the compressor sleeve 11 is limited by a projection or collar 18 on the handle rod 4. The tip 19 of the dome 12 abuts the collar 18 in the initial position of the compressor sleeve 11.

On the free end of the outer tube 8 is a cup 21 in frictional engagement with the outer periphery of outer tube 8. A bead 22 of the cup 21 projects below and inwardly of outer tube 8. The cup 21 has a plug 23 frictionally engaging the inner periphery of the bottom 7 of the head 6. The plug 23 has a passage 24 therethrough. A suction tube 26 extends from the plug 23 in continuation of passage 24. The inside walls 25 of the cup 21 are suitably curved so as to direct air upwardly and through the extension tube 26. A plurality of apertures 28 extend through the walls of the cup 21 so as to communicate the space or passage 9 between the head 6 and the tube 8 with the interior of the cup 21 just above the bead 22.

In operation the fly swatter is used in the usual manner. After an insect or a fly is killed or lies on a surface, then the bead 22 of the cup is placed so as to surround the insect 29 as indicated in FIG. 2. Thereupon the compressing sleeve 11 is pushed down toward the head 22 from the position shown in FIG. 2 into the position shown in FIG. 3 thereby compressing and expelling air from the compressor sleeve 11 through the tubular passage 9 and apertures 28 into the cup 21. The compressed air so expelled picks up the insect 29 and carries it up through the cup passage 24 and extension tube 26. The insect 29 loses momentum in and abuts against the wall of the head 6 and falls back into the pocket 31 formed around the top of the plug 23 inside the head 6.

In the above manner insects can be quickly collected in the handle of the swatter and they can be easily disposed of by pulling the plug 23 out of the head 6. The air escaping through the handle rod 4 ultimately escapes through holes 32 in the hub 2 around the pocket 3 of the fly swatter 1.

The invention is simple in construction and simple in operation and is eminently adapted for its purposes.

I claim:
1. A fly swatter handle comprising
   (a) a tubular handle rod
   (b) a head formed on the free end of said rod
   (c) a hollow cup on the free end of the said head having an aperture therein communicating with the interior of said head and having a mouth edge for bearing on a surface about an insect
   (d) a handle element on said head reciprocable axially relatively to said head,
   (e) a compressor member on said handle element,
   (f) a system of passages in said head communicating air flow from said compressor member with said hollow cup thereby to force air through said cup and through said aperture into the interior of said head for carrying said insect from said surface into said head.
2. The fly swatter handle defined in claim 1, and
   (g) means on said mouth edge of said cup engageable with the surface to seal said cup when pressed against said surface so as to confine the flow of air from said cup upwardly into said head.
3. The invention defined in claim 2 and
   (h) resiliently yieldable means normally to urge said reciprocable handle element to an initial position spacing said compressor means away from said head.
4. A fly swatter handle comprising
   (a) a tubular handle rod
   (b) a head on the free end of said rod forming an enlarged chamber open at its bottom
   (c) an outer tube surrounding said head and spaced from said head to form a passage between said head and said outer tube
   (d) a plug in the bottom of said head engaging said outer tube and being formed into a cup to engage and seal an area about an insect
   (e) said plug having apertures communicating said passage with the interior of said cup
   (f) reciprocating compressor means slidable on said outer tube for expelling air through said passage and through said apertures
   (g) and means to conduct said expelled air from said cup into said head thereby to collect insects carried by said air from said area engaged by said cup.
5. The invention defined in claim 4 and resiliently compressible means to hold said reciprocating means in an initial position.
6. A fly swatter handle comprising
   (a) a tubular handle rod
   (b) a tubular enlarged head on the free end of said rod forming a collecting chamber and being open at its bottom (c) an outer tube on the outside of said head spaced from said head to form a passage from the top of the head to the bottom of the head (d) a reciprocating element slidable on said outer tube (e) a reciprocating head on said slidable element slidably guided on said rod (f) a spring between said head on said rod and said reciprocating head normally to urge the said reciprocating head away from said head on said rod (g) a cup engaging said outer tube and extending into the bottom of said head on said rod (h) a bead part of said cup engageable with a surface around an insect to confine air within said cup (i) said cup having apertures to conduct air from said passage into said cup (j) and an extension from said cup conducting air forced by said reciprocating element through said passage and through said cup thereby to carry the insect into said head on the end of the rod for collecting the same, said extension being of smaller circumferential area than said head on said rod thereby to form a collecting pocket within said head on said rod.

References Cited by the Examiner
UNITED STATES PATENTS

| | | | |
|---|---|---|---|
| 984,098 | 2/11 | Lundin | 15—344 X |
| 1,141,039 | 5/15 | Cox | 43—139 |
| 1,308,497 | 7/19 | Jolly | 43—139 |
| 1,797,557 | 3/31 | Stine et al. | 43—139 |

SAMUEL KOREN, *Primary Examiner.*

ABRAHAM G. STONE, *Examiner.*